US007480337B2

(12) United States Patent
Lewis

(10) Patent No.: US 7,480,337 B2
(45) Date of Patent: Jan. 20, 2009

(54) TRACKING SYSTEM COMPRISED IN AN OFDM RECEIVER

(75) Inventor: Michael Lewis, Märsta (SE)

(73) Assignee: Infineon Technologies AG, Munich (DE)

( * ) Notice: Subject to any disclaimer, the term of this patent is extended or adjusted under 35 U.S.C. 154(b) by 599 days.

(21) Appl. No.: 11/086,504

(22) Filed: Mar. 22, 2005

(65) Prior Publication Data

US 2005/0213678 A1    Sep. 29, 2005

(30) Foreign Application Priority Data

Mar. 23, 2004  (EP)  ................... 04006933

(51) Int. Cl.
*H04K 1/10* (2006.01)
(52) U.S. Cl. .................................... 375/260
(58) Field of Classification Search ........... 375/259, 375/260, 261, 262, 269, 271, 279, 316, 322, 375/324, 326, 346, 226, 340, 349, 354, 357, 375/369, 372, 373, 374; 370/203, 207, 208, 370/210, 395.62, 507; 455/265; 702/89; 713/375, 400

See application file for complete search history.

(56) References Cited

U.S. PATENT DOCUMENTS

| 5,228,062 | A | 7/1993 | Bingham | 375/97 |
| 6,219,334 | B1 * | 4/2001 | Sato et al. | 370/210 |
| 6,618,352 | B1 * | 9/2003 | Shirakata et al. | 370/203 |
| 6,944,122 | B2 * | 9/2005 | Shirakata et al. | 370/208 |
| 7,009,932 | B2 * | 3/2006 | Matheus et al. | 370/208 |
| 7,068,593 | B2 * | 6/2006 | Cho et al. | 370/208 |
| 2002/0064240 | A1 | 5/2002 | Joshi et al. | 375/326 |
| 2002/0101840 | A1 | 8/2002 | Davidsson et al. | 370/330 |
| 2004/0156309 | A1 * | 8/2004 | Chadha et al. | 370/208 |
| 2005/0117667 | A1 * | 6/2005 | Yajima et al. | 375/324 |

FOREIGN PATENT DOCUMENTS

CN    1236513 A    11/1999

OTHER PUBLICATIONS

IEEE Std. 802.11a; "Wireless LAN Medium Access Control (MAC) and Physical Layer (PHY) specifications: High-speed Physical Layer in the 5 GHz Band", 1999.

* cited by examiner

*Primary Examiner*—Sam K Ahn
(74) *Attorney, Agent, or Firm*—Coats & Bennett, P.L.L.C.

(57) ABSTRACT

According to one embodiment, a method for tracking rapid changes in frequency and phase offset in an Orthogonal Frequency Division Multiplexing (OFDM) receiver includes correcting a frequency error of a received OFDM symbol. A Fourier transform operation is performed resulting in a number of independently modulated subcarriers. An initial coarse estimate of the phase of the received OFDM symbol is performed based on the phase of pilot subcarriers. An initial correction of a symbol phase is performed. A data-driven phase estimation is performed on the corrected symbol resulting in a refined phase estimate. A second, more precise, correction of the received OFDM symbol phase is performed. Phase and frequency tracking is performed based on the refined phase estimated.

20 Claims, 6 Drawing Sheets

TRACKING SYSTEM COMPRISED IN AN OFDM RECEIVER

PRIORITY

This application claims priority to European Patent application no. 04006933.8 filed Mar. 23, 2004.

TECHNICAL FIELD OF THE INVENTION

The present invention relates in a first aspect to a tracking system comprised in an Orthogonal Frequency Division Multiplexing (OFDM) receiver.

According to a second aspect the present invention relates to a method for tracking rapid changes in frequency and phase offset in an OFDM receiver.

According to a third aspect the present invention relates to at least one computer program product for tracking rapid changes in frequency and phase offset in an OFDM receiver.

BACKGROUND OF THE INVENTION

A well-known issue in designing transceiver systems in which rapid transitions must be made between e.g. receive and transmit states or between idle and receive states, is that the local oscillators on the system can suffer a perturbation from their stable operating frequency. This can, for example, be due to a sudden change in load on the power supply. An example of such a glitch is shown in FIG. 1, related to the preamble of an IEEE 802.11 WLAN OFDM transmission. In FIG. 1, 2 denotes the short preamble symbols, 4 denotes the cyclic prefix (CP) and the long preamble symbols, 6 denotes the SIGNAL field and 8 denotes the data symbols. The VCO frequency is shown initially at one stable level; when the transmission begins, the operating conditions change and the VCO moves to a different stable operating frequency. Since the VCO operates in a feedback loop, it takes time for the frequency to converge on the new stable operating frequency.

Although it may be possible to design ones own receiver to have an extremely stable VCO, it is impossible in an open market such as that for WLAN devices to be sure that competitors' devices have equally high standard for their transmitters. To be interoperable, it is therefore necessary to be able to compensate for such deviations.

In a typical WLAN receiver, an initial coarse estimate of the frequency offset will be made during the short preamble symbols. A more precise estimate will be made during the long preamble symbols. The changing frequency of the VCO means that the frequency estimates are likely to be inaccurate; and even if a fairly accurate frequency estimate has been made by the end of the long preamble symbols, the frequency is likely to change further.

The problems caused by a residual frequency error will be explained with reference to the operation of a simplified digital OFDM receiver datapath as shown in FIG. 2.

The first operation in the datapath is to correct the frequency error, which is achieved by a progressively phase rotation of the incoming I/Q samples, which is intended to exactly cancel out the phase rotation of the incoming signal due to the frequency offset. In the absence of any other input, the frequency correction is based on the initial frequency estimate.

This operation is performed in the frequency correction block 10.

The next operation is to perform a fast Fourier transform (FFT), at the block 12, on the received data. This separates the received time-domain symbol into a number of independently modulated sub-carriers. In an 802.11a OFDM transmission, there are 52 sub-carriers, of which 48 are used to transmit data and 4 are pilot tones modulated with a known sequence.

Next, the sub-carriers extracted by the FFT 12 are demodulated, at the demodulation block 14, (converted from symbols into [soft] data bits). In order to perform the demodulation, it is necessary to have an estimate of the channel transfer function for each subcarrier, which is represented by a scaling and a rotation of the transmitted constellation. The initial channel estimate is typically obtained during the long preamble symbols.

Finally, error correction, at the error correction block 16, is applied to the received data stream. In an 802.11 OFDM transmission, a Viterbi decoder is typically used to perform the error correction function.

D denotes the data outputted from the OFDM receiver.

A residual frequency error means that the frequency correction block will not completely remove the frequency offset. The first problem that this causes is that there is a progressively increasing phase rotation of the received signal at the output of the frequency correction block. The demodulation process is based on the received signal phase as estimated during the long preamble. The progressive phase rotation caused by the frequency error means that there will be an increasing phase error with respect to the channel estimate. At a certain point, this will lead to uncorrectable demodulation errors. An example of this is shown in FIG. 3: the unrotated received I/Q vector is shown as a solid line, and is near to the correct constellation point corresponding to the transmitted data. E denotes the correct constellation point for received vector and F denotes all of the ideal constellation points according to channel estimate. As the received vector is progressively rotated away from E, it is clear to see that at some point demodulation errors occur. To keep a reasonable degree of clarity in the figure, the example shown uses 16-QAM modulation; IEEE 802.11 OFDM transmissions also use 64-QAM for higher rate transmissions. Since 64-QAM has 4 times as many constellation points it is clearly much more sensitive to phase errors.

A second problem, caused by moderate to severe frequency estimation errors, is loss of orthogonality in the FFT. In the absence of a frequency error, the subcarriers are perfectly separable from one another (the energy from one subcarrier does not interfere at all with another subcarrier). However, if the frequency offset becomes at all large, a significant amount of inter-carrier interference occurs which is visible as noise in the signal at the demodulator.

If it is possible to measure the phase and frequency errors of the signal during reception, it is conceptually possible to correct for them. The phase error of a received I/Q vector can be estimated based on knowledge of the channel estimate and the transmitted constellation point, by directly measuring the angle from the expected constellation point and the actual received vector. This estimate is perturbed by errors in the channel estimate and by noise; an improved estimate for the phase can be obtained in an OFDM symbol by measuring the phase error over a number of subcarriers, possibly also with weighting according to the strength of the subcarrier signals.

The frequency error is simply the change in the phase estimate with time, and can be estimated by dividing the phase change between two symbols with the symbol period.

As mentioned, in order to estimate the phase and frequency error, it is necessary to know the constellation point corresponding to the transmitted signal. One possible solution to this problem is to use the demodulated data to try to determine the correct constellation point, using an architecture such as that shown in FIG. 4, called data-driven phase and frequency tracking. The corresponding function blocks in FIGS. 2 and 4 have been denoted with the same reference signs and will not be explained again. In FIG. 4 there is also disclosed a frequency estimation block 18 connected to the block 12 and to the block 10. Finally, there is also a remodulation block 20 connected to the frequency estimation block 18. Demodulated data can be taken at two possible locations: for greatest robustness, it should be taken at the output of the error correction block, since this ensures the minimum number of selection errors. However, it may also be taken from before the error correction block.

This demodulated data is then re-modulated (mapped back into I/Q constellation points) for each subcarrier in the OFDM symbol, based on the channel estimate. It is then possible to use all of the subcarriers in the OFDM symbol to make an estimate of the overall phase rotation of the OFDM symbol.

Typically, this phase error is used as an input to a PID (proportional, integral, derivative) control loop, which uses the instantaneous estimates for the phase and frequency error plus an integral phase term to drive the input to the frequency correction block, thereby simultaneously tracking errors in both phase and frequency.

As was mentioned earlier, an IEEE 802.11a OFDM transmission uses only 48 of the 52 subcarriers for carrying data. The remaining 4 pilot tones are modulated with a known sequence, and these can therefore be used directly for the measurement of phase error.

An example architecture is shown in FIG. 5, called pilot-based phase and frequency tracking. The corresponding function blocks in FIGS. 2, 4 and 5 have been denoted with the same reference signs and will not be explained again. In FIG. 5 there is also disclosed a phase correction block 22 connected to the block 12 and to the block 14. Finally, there is also a pilot-based phase estimation block 24 connected to the block 10 and to the block 22. The pilot-based phase estimation block extracts the pilot subcarriers from the data stream, and uses them to calculate an estimate of the phase rotation for the current OFDM symbol. This estimate of the phase error is then used by the phase correction block, which de-rotates the received symbol prior to demodulation.

It is also necessary to correct the frequency error in order to avoid loss of FFT orthogonality. This is done by estimating the residual frequency error based on the symbol-by-symbol rate of phase change, and feeding back this estimate to the frequency correction block, which adds the residual frequency error estimate to the correction frequency.

Data-driven frequency and phase tracking has the advantage that it maximizes noise rejection by taking into account all of the available subcarriers in the signal. However, a major drawback is that, in order to obtain reliable data estimates, it is necessary to take the data from the output of the error correction block. This block has a large latency (usually several data symbols), which means that the frequency tracking loop is very slow to respond. For all but very minor residual frequency errors, the accumulated phase error will become so great that demodulation fails and the frequency tracking loop breaks down.

If the data is taken from before the error correction block, the latency can be reduced. However, in the presence of moderately sudden changes in frequency offset, the resulting phase error will cause a large number of data estimates to be incorrect. This will have the effect of reducing or even reversing the phase error estimate and will cause the frequency tracking loop to break down.

The pilot-based method is very robust, since the pilot tones are known in advance and the phase correction is applied immediately, and can therefore cope with large and rapid swings in frequency. The problem with the pilot-based solution, however, is the noise introduced by the phase estimate due to it being made over only the 4 pilot subcarriers. This noise directly modulates the received symbol, increasing the error vector magnitude and thereby the error probability.

SUMMARY OF THE INVENTION

The object with the present invention is to solve the above mentioned problems. A tracking system according to the present invention is comprised in an OFDM receiver. The tracking system is operable to track rapid changes in frequency and phase offset of the received signal. The tracking system comprises a frequency correction means operable to correct a frequency error of a received OFDM symbol. The tracking system also comprises a to the frequency correction means connected transforming means operable to perform a Fourier transform operation resulting in a number of independently modulated subcarriers. The tracking system also comprises a to the transforming means connected first estimating means operable to perform an initial coarse estimate of the phase of the received OFDM symbol, based on the phase of one or more subcarriers carrying pilot tones. The tracking system also comprises a to the first estimating means connected first phase correction means operable to perform an initial correction of the symbol phase. The tracking system also comprises a to the first phase correction means connected second estimating means operable to perform a data-driven phase estimation on the corrected symbol resulting in a refined phase estimate. The tracking system also comprises a to the second estimating means connected phase and frequency tracking means.

An advantage with the tracking system according to the present invention is that it gives phase- and frequency-tracking which has the robustness of pilot-based phase and frequency tracking, while having the low estimation noise available from using data-driven tracking over all subcarriers. While the estimation noise is not quite as low as that available from the post-Viterbi derived estimate, due to possible demodulation errors, experience has shown that performance is acceptable. Also, the use of the soft decisions from demodulation to weight the contributions to the channel estimates improves performance.

A further advantage in this connection is achieved if the tracking system also comprises a to the first phase correction means connected first demodulating means operable to demodulate the phase-corrected OFDM symbol to produce a data stream, and a to the demodulating means connected remodulating means operable to remodulate the data stream, which remodulating means also is connected to the second estimating means.

A further advantage in this connection is achieved if the tracking system also comprises a second phase correction means connected to the second estimating means and to the transforming means, which second phase correction means is operable to perform a more precise correction of the received OFDM symbol phase.

In this connection, a further advantage is achieved if the phase and frequency tracking means comprises a to the second phase correction means connected second demodulating means, which in turn is connected to an error correction means resulting in the final estimate of the received data sequence.

In this connection, a further advantage is achieved if the second estimating means, the first demodulating means and the second demodulating means are provided with an initial estimate of the channel transfer function for each subcarrier.

A further advantage in this connection is achieved if the tracking system also comprises a first weighting means operable to weight the contribution to the estimate of the OFDM symbol phase from each subcarrier according to the strength of that subcarrier.

In this connection, a further advantage is achieved if the tracking system also comprises a second weighting means operable to weight the phase estimate from each subcarrier according to a distance between a received I-Q vector and the nearest constellation point.

A further advantage in this connection is achieved if the distance between the received I-Q vector and the nearest constellation point is used to weight the contribution to the overall phase estimate from this subcarrier such that received I-Q vectors with lower probability of being associated with the constellation point contribute less.

A method may comprise the steps:
to correct a frequency error of a received OFDM symbol;
to perform a Fourier transform operation resulting in a number of independently modulated subcarriers;
to perform an initial coarse estimate of the phase of the received OFDM symbol, based on the phase of the pilot subcarriers;
to perform an initial correction of the symbol phase;
to perform a data-driven phase estimation on the corrected symbol resulting in a refined phase estimate; and
to perform a phase and frequency tracking based on the refined phase.

The proposed method gives phase- and frequency-tracking which has the robustness of pilot-based phase and frequency tracking, while having the low estimation noise available from using data-driven tracking over all subcarriers. While the estimation noise is not quite as low as that available from the post-Viterbi derived estimate, due to possible demodulation errors, experience has shown that performance is acceptable. Also, the use of the soft decisions from demodulation to weight the contributions to the channel estimates improves performance.

A further advantage in this connection is achieved if the method also comprises the steps:
to demodulate the phase corrected OFDM symbol to produce a data stream; and
to remodulate the data stream.

In this connection, a further advantage is achieved if the method also comprises the step:
to perform a second, more precise, correction of the received OFDM symbol phase.

A further advantage in this connection is achieved if the method also comprises the step:
to perform a second demodulation; and
to perform an error correction resulting in the final estimate of the received data sequence.

In this connection, a further advantage is achieved if the method also comprises the step:
to provide each of the steps of the data-driven phase estimation, the first and second demodulation with an initial estimate of the channel transfer function for each subcarrier.

A further advantage in this connection is achieved if the method also comprises the step:
to weight the contribution to the estimate of the channel transfer function from each subcarrier according to the strength of the subcarrier.

In this connection, a further advantage is achieved if the method also comprises the step:
to weight the phase estimate from each subcarrier according to a distance between a received I-Q vector and the nearest constellation point.

A further advantage in this connection is achieved if the weighting is such that the lower the probability that the received I-Q vector belongs to the nearest constellation point, the smaller is the contribution to the overall phase estimate for this subcarrier.

The above mentioned problems can also be solved with at least one computer program product. The at least one computer program product directly loadable into the internal memory of at least one digital computer, comprises software code portions for performing the steps of the above described method when the at least one product is/are run on the at least one computer.

An advantage with the at least one computer program product is that it gives phase- and frequency-tracking which has the robustness of pilot-based phase and frequency tracking, while having the low estimation noise available from using data-driven tracking over all subcarriers. While the estimation noise is not quite as low as that available from the post-Viterbi derived estimate, due to possible demodulation errors, experience has shown that performance is acceptable. Also, the use of the soft decisions from demodulation to weight the contributions to the channel estimates improves performance.

The present invention will in the following by way of embodiments be described in more detail, in conjunction with the enclosed drawings, in which:

DETAILED DESCRIPTION OF EMBODIMENTS

Figure 1:
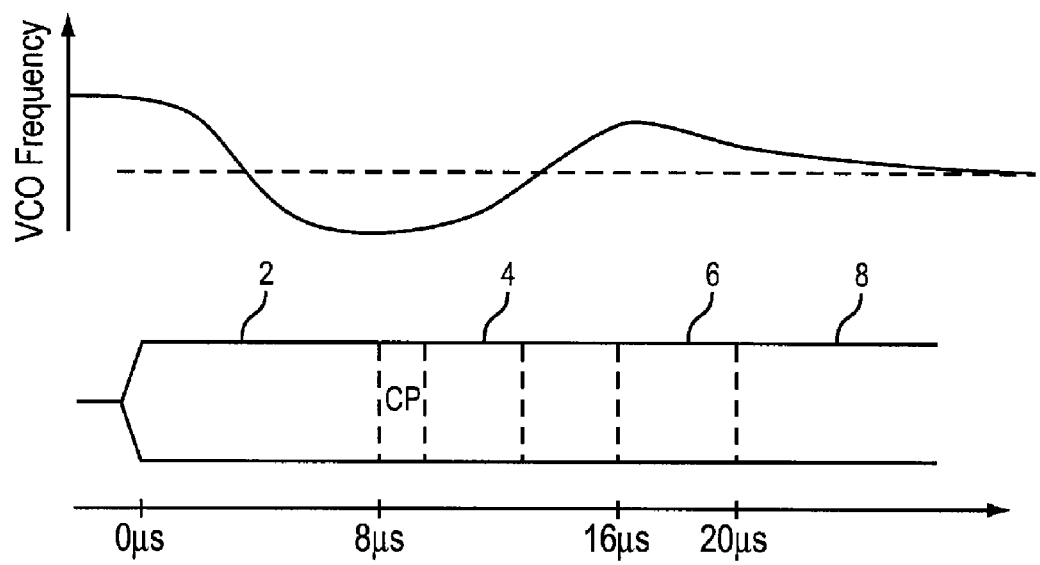
FIG. 1 shows an example of VCO glitch in relation to a 802.11a preamble.
Figure 2:
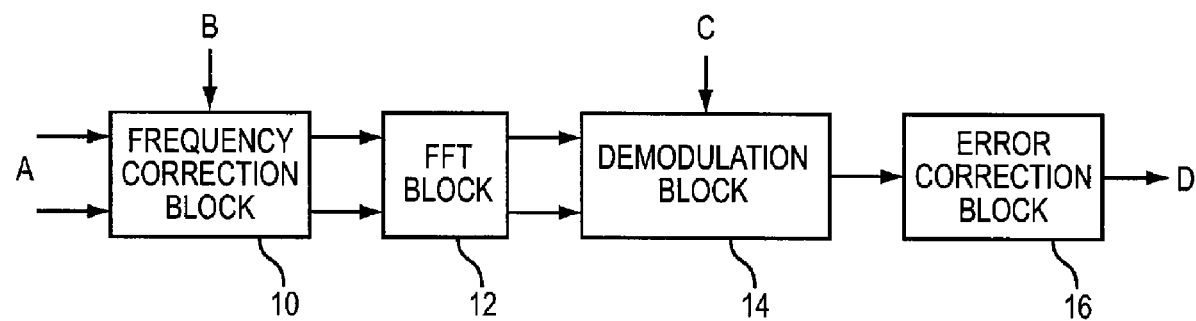
FIG. 2 is a block diagram of a digital OFDM receiver according to the prior art.
Figure 3:
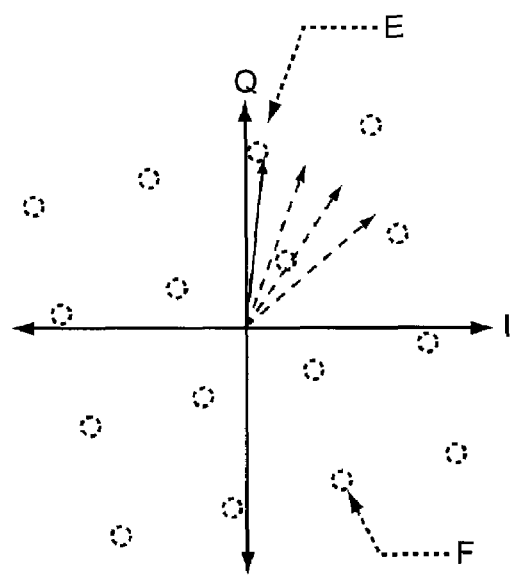
FIG. 3 is a I-Q-diagram disclosing the effect of signal phase rotation on demodulation.
Figure 4:
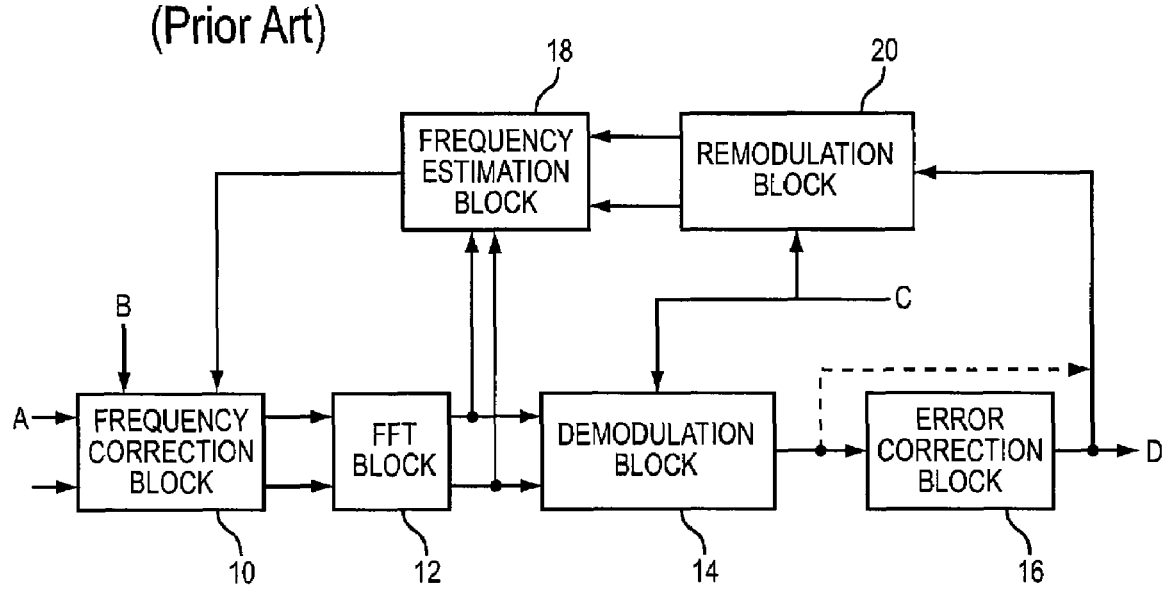
FIG. 4 is a block diagram of a data-based frequency and phase tracking system according to the prior art.
Figure 5:
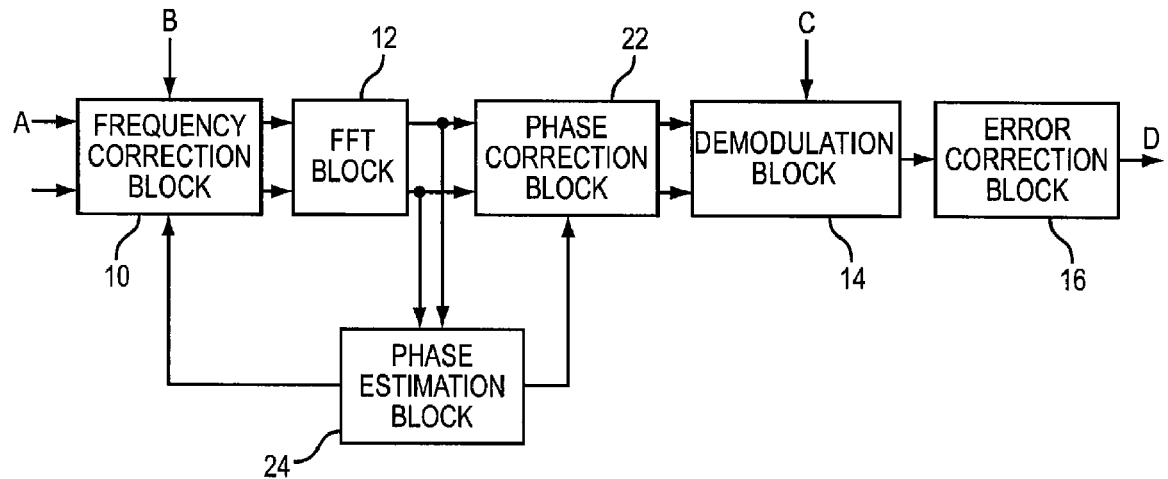
FIG. 5 is a block diagram of a pilot-based phase and frequency tracking system according to the prior art.
Figure 6:
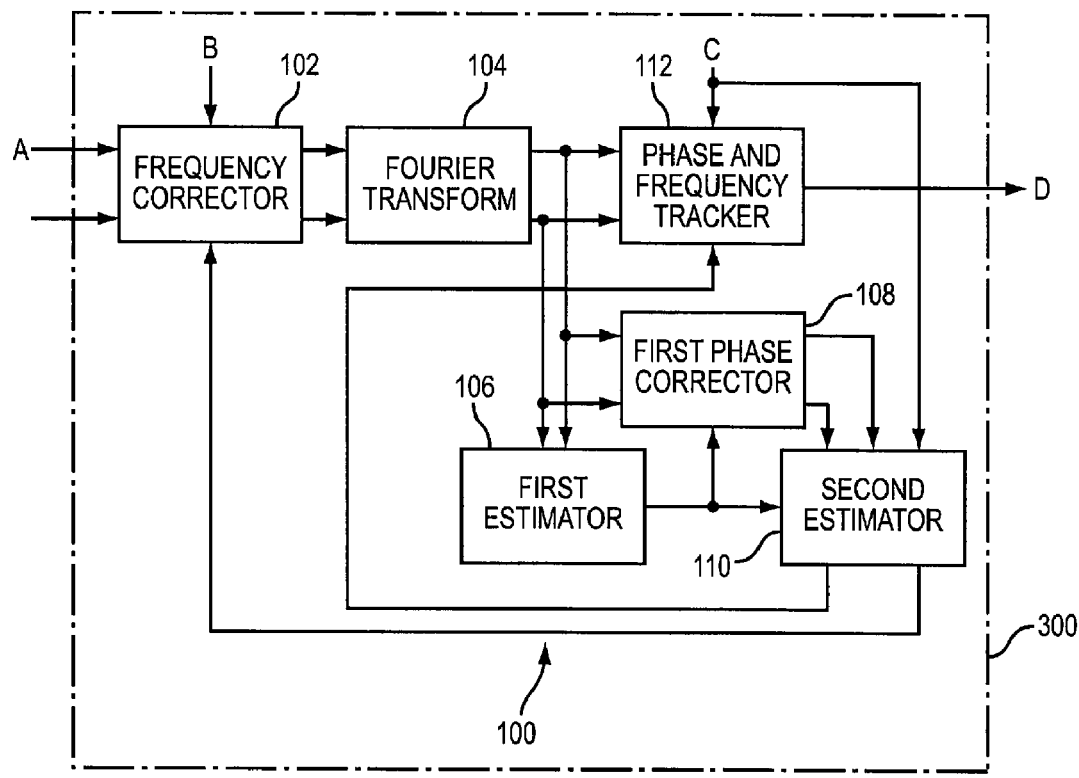
FIG. 6 is a block diagram of a tracking system operable to track rapid changes in frequency and phase offset of the received signal according to the present invention.

In FIG. 6 there is disclosed a block diagram of a tracking system 100 according to the present invention. The tracking system 100 is comprised in an OFDM receiver 300, which only is disclosed diagrammatically in FIG. 6. The tracking system 100 is operable to track rapid changes in frequency and phase offset of the received signal. The tracking system 100 comprises a frequency correction means 102 operable to correct a frequency error of a received OFDM symbol, A, i.e. I/Q Rx samples. A transforming means 104 is connected to said frequency correcting means 102, which transforming means 104 is operable to perform a Fourier transform operation resulting in a number of independently modulated subcarriers. The tracking system 100 also comprises a to said transforming means 104 connected first estimating means 106 operable to perform an initial coarse estimate of the phase of the received OFDM symbol, based on the phase of one or more subcarriers carrying pilot tones. The tracking system 100 also comprises a to said first estimating means 106 connected first phase correction means 108 operable to perform an initial correction of the symbol phase. A second estimating means 110 is connected to said first phase correction means 108, which second estimating means 110 is operable to perform a data-driven phase estimation on the corrected symbol resulting in a refined phase estimate. Phase and frequency tracking means 112 is connected to the second estimating means 110. The reference signs A, B, C and D has the same meaning as in FIGS. 2, 4 and 5.

Figure 7:
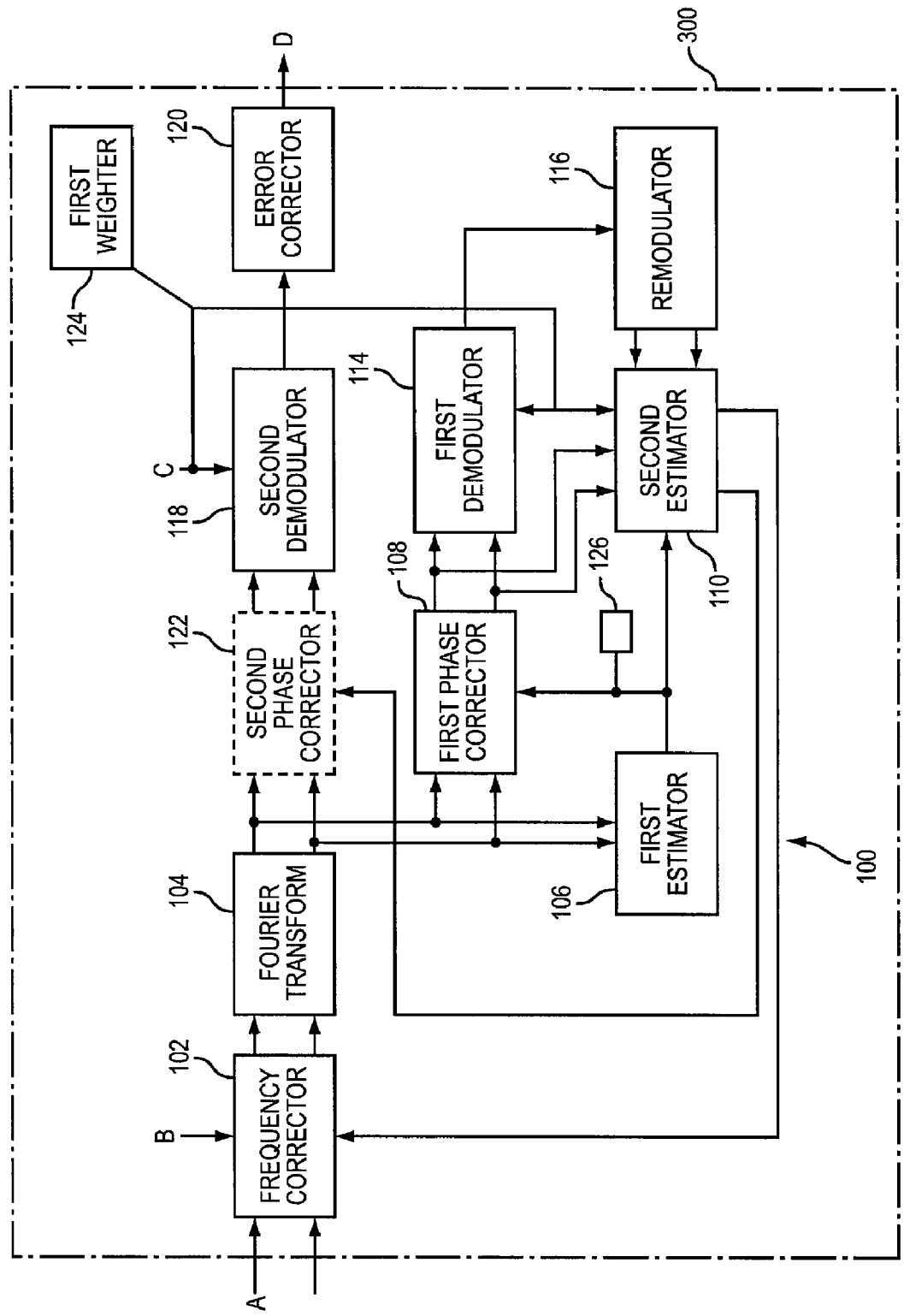
FIG. 7 is a more detailed block diagram of the tracking system disclosed in FIG. 6.

In FIG. 7 there is disclosed a more detailed block diagram of the tracking system 100 disclosed in FIG. 6. Some of the means/functional blocks in FIG. 7 corresponds to the same means/functional blocks and these have been allocated the same reference signs in both FIG. 6 and FIG. 7 and will not be described again. The tracking system 100 disclosed in FIG. 7 also comprises a to said first phase correction means 108 connected first demodulating means 114 operable to demodulate said phase corrected OFDM symbol to produce a data stream. A remodulating means 116 is connected to said demodulating means 114, which remodulating means 116 is operable to remodulate said data stream. As is apparent from FIG. 7, said remodulating means 116 is also connected to said second estimating means 110. The tracking system 100 also comprises a to said transforming means 104 connected second demodulating means 118, which in turn is connected to an error correction means 120 resulting in said final estimate of the received data sequence. The tracking system 100 can also comprise a second phase correction means 122, disclosed with a dotted line, connected to said second estimating means 110, to said transforming means 104 and to said second demodulating means 118. The second phase correction means 122 is operable to perform a more precise correction of the received OFDM symbol phase. In the tracking system 100 disclosed in FIG. 7 there is also a first weighting means 124 operable to weight the contribution to the estimate of the OFDM symbol phase from each subcarrier according to the strength of the subcarrier. In FIG. 7 there is also disclosed a second weighting means 126 operable to weight the contribution to the phase estimate from each subcarrier according to a distance between the received I-Q vector and the nearest constellation point for that subcarrier, such that received I-Q vectors with smaller probability of being associated to the nearest constellation point have a smaller contribution to the overall estimate from this subcarrier.

In a preferred embodiment of the tracking system 100, said first demodulating means 114 and said second demodulating means 118 are provided with an initial estimate of the channel transfer function for each subcarrier.

The invention combines an initial estimation and correction of the phase of the received OFDM symbol, based on the phase of the pilot subcarriers, with a subsequent refined phase estimation based on demodulated data (without error correction). This refined phase estimation can then be used as the basis for conventional frequency and phase tracking (e.g. via a PID loop) as well as for phase correction of the OFDM symbol prior to demodulation if so desired.

An example implementation is shown in FIG. 6. After the FFT, a pilot-based phase estimation block generates an initial phase estimate of the OFDM symbol phase, based on the phase of the pilots. This initial phase estimate is used by the phase correction block to perform a first phase correction of the OFDM symbol.

The phase-corrected OFDM symbol is then demodulated to produce a data stream, which passes directly into a remodulation block. In the absence of errors in the demodulated data, the remodulated I-Q vector for each subcarrier corresponds to the ideal constellation point given the transmitted I-Q vector and the channel estimate for that subcarrier. Given the received I-Q vectors and ideal constellation points for each subcarrier, it is thereby possible to calculate a refined phase estimate that uses all of the subcarriers of the OFDM symbol and thereby has very much lower noise than the pilot-based estimate that uses only 4 out of 52 subcarriers.

This refined phase estimate can then be used for phase and frequency tracking (e.g. in a conventional PID loop). The phase estimate is also used to perform a more precise correction of the received OFDM symbol phase. This improves robustness to very sudden frequency shifts. Since the phase estimate has low noise, this phase correction does not degrade the error vector magnitude seen at the demodulator in the same way as it does when the phase estimation is based only on the pilot subcarriers.

The phase-corrected OFDM symbol then passes through demodulation and error correction processes to provide the final estimate of the received data sequence. Note that, if the additional robustness to sudden frequency changes is not required (e.g. if the frequency/phase tracking can respond sufficiently quickly to expected frequency transients), the final phase correction may not be necessary.

Errors in demodulation can result due to noise and errors in the initial phase estimate. The effect of this will be that the wrong constellation point will be selected (the process of demodulation can be thought of as simply choosing the "nearest" constellation point to the received I-Q vector). These errors will disturb the overall phase estimate to some extent. However the effects of these errors can be minimized by a number of techniques applied when calculating the data-based phase estimate.

Firstly, some subcarriers are received more strongly than others due to the properties of the channel. The stronger subcarriers are less likely to be received in error. It is therefore possible to weight the contribution to the channel estimate from each subcarrier according to the strength of the subcarrier. This is a fairly well known technique.

Secondly, where "soft" demodulation is performed, it is possible to weight the phase estimate from each subcarrier according to the likelihood that the demodulation decision is correct. For instance, when the received I-Q vector lies very close to one of the constellation points, it is highly likely that this is the correct constellation point and so the contribution to the overall phase estimate for this subcarrier is made large. When the received I-Q vector lies halfway between two constellation points, it is hard to say which of the constellation points was more likely and so the contribution to the overall phase estimate from this subcarrier is made small.

Figure 8:
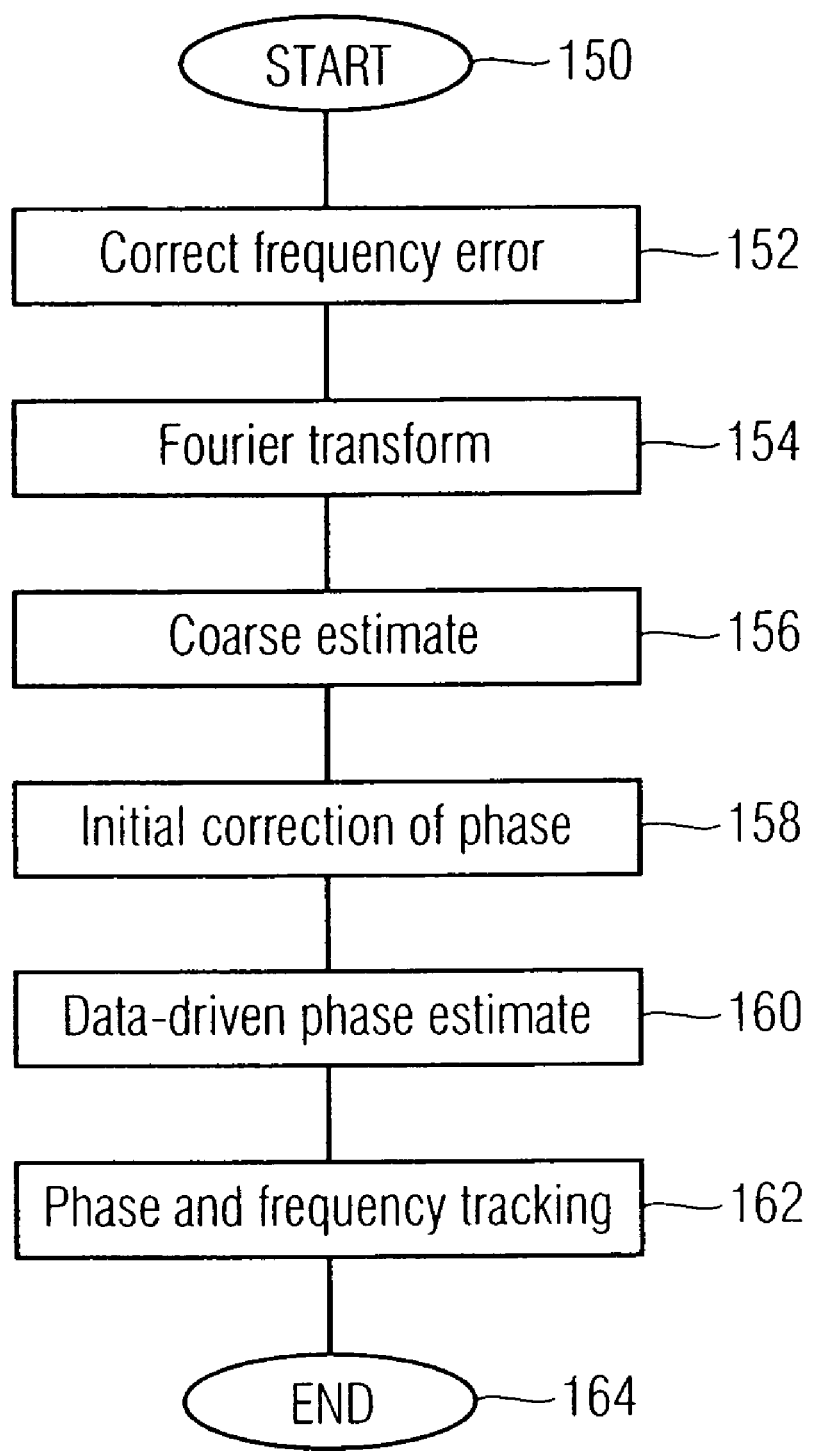
FIG. 8 is a flow chart of a method for tracking rapid changes in frequency and phase offset in an OFDM receiver according to the present invention.

In FIG. 8 there is disclosed a flow chart of the method for tracking rapid changes in frequency and phase offset in an OFDM receiver. The method begins at block 150. The method continues, at block 152, with the step: to correct a frequency error of a received OFDM symbol. Thereafter, the method continues, at block 154, with the step: to perform a Fourier transform operation resulting in a number of independently modulated subcarriers. The method continues, at block 156, with the step: to perform an initial coarse estimate of the phase of the received OFDM symbol, based on the phase of one or more subcarriers carrying pilot tones. Thereafter, the method continues, at block 158, with the step: to perform an initial correction of the symbol phase. The method continues, at block 160, with the step: to perform a data-driven phase estimation on the corrected symbol resulting in a refined phase estimate. Thereafter the method continues, at block 162, with the step: to perform a phase and frequency tracking to provide a final estimate of the received data sequence. The method is finished at block 164.

In a preferred embodiment said method also comprises the steps:

to demodulate said phase corrected OFDM symbol to produce a data stream; and to remodulate said data stream.

In a preferred embodiment said method also comprises the step:

to perform a second, more precise, correction of the received OFDM symbol phase.

In a preferred embodiment said method also comprises the step:

to perform a second demodulation; and to perform an error correction resulting in said final estimate of the received data sequence.

In a preferred embodiment said method also comprises the step:

to provide each of the steps of said data-driven phase estimation, said first and second demodulation with an initial estimate of the channel transfer function for each subcarrier.

In a preferred embodiment said method also comprises the step:

to weight the contribution to the estimate of the channel transfer function from each subcarrier according to the strength of the subcarrier.

In a preferred embodiment said method also comprises the step:

to weight the phase estimate from each subcarrier according to a distance between a received I-Q vector and the nearest constellation point.

In a preferred embodiment the smaller said distance between the received I-Q vector and the nearest constellation point, the larger is the contribution to the overall phase estimate for this subcarrier.

Figure 9:
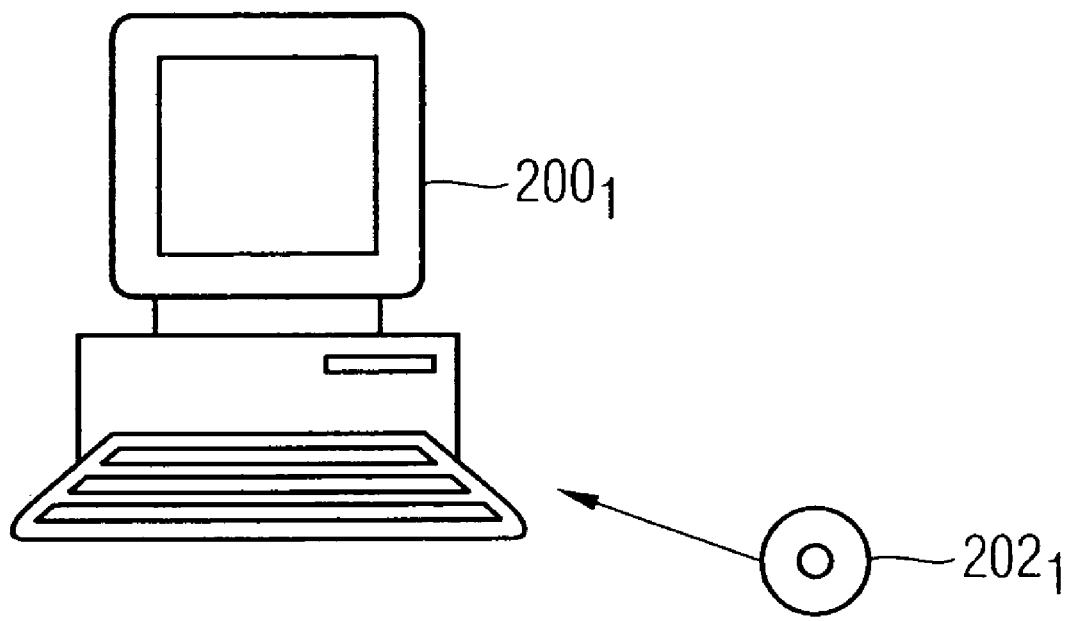
FIG. 9 show some examples of computer program products according to the present invention.
Figure 9:
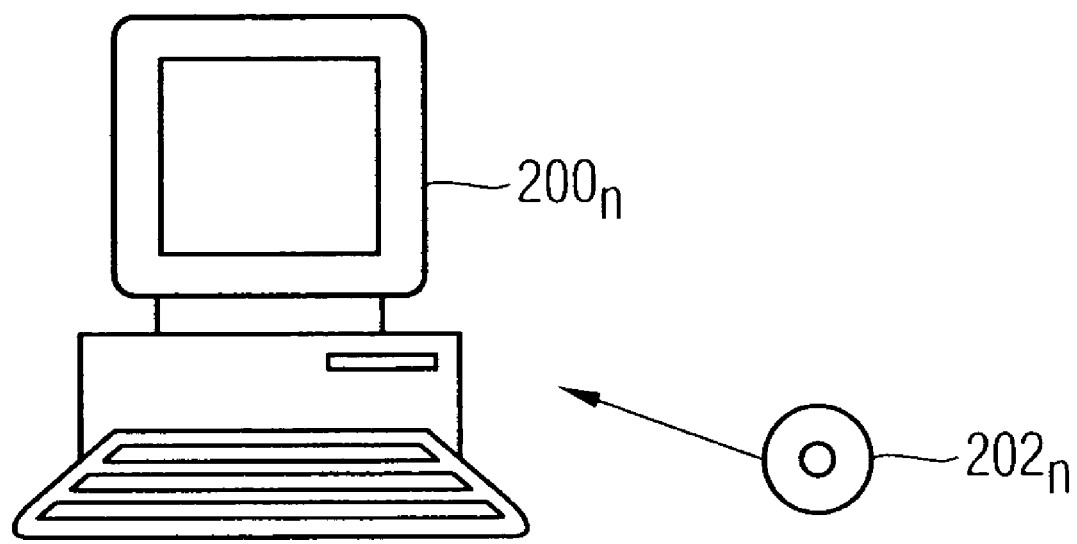

In FIG. 9 there is disclosed a schematic diagram of some computer program products according to the present invention. There is disclosed n different digital computers $200_1, \ldots, 200_n$, wherein n is an integer. There is also disclosed n different computer program products $202_1, \ldots, 202_n$, here showed in the form of compact discs. The different computer program products $202_1, \ldots, 202_n$ are directly loadable into the internal memory of the n different digital computers $200_1, \ldots, 200_n$. Each computer program product $202_1, \ldots, 202_n$ comprises software code portions for performing some or all the steps of FIG. 9 when the product(s) $202_1, \ldots, 202_n$ is/are run on said computer(s) $200_1, \ldots, 200_n$. Said computer program products $202_1, \ldots, 202_n$ can e. g. be in the form of floppy disks, RAM disks, magnetic tapes, opto magnetical disks or any other suitable products.

The invention is not limited to the embodiments described in the foregoing. It will be obvious that many different modifications are possible within the scope of the following claims.

I claim:

1. A tracking system comprised in an Orthogonal Frequency Division Multiplexing (OFDM) receiver, which tracking system is operable to track rapid changes in frequency and phase offset, wherein said tracking system comprises:

a frequency correction means operable to correct a frequency error of a received OFDM symbol, a transforming means connected to said frequency correcting means operable to perform a Fourier transform operation resulting in a number of independently modulated subcarriers, a first estimating means connected to said transforming means operable to perform an initial coarse estimate of the phase of the received OFDM symbol, based on the phase of pilot subcarriers, a first phase correction means connected to said first estimating means operable to perform an initial correction of a symbol phase, a second estimating means connected to said first phase correction means operable to perform a data-driven phase estimation on the corrected symbol resulting in a refined phase estimate, and a second phase correction means connected to said second estimating means and to said transforming means, said second phase correction means being operable to perform a more precise correction of the received OFDM symbol phase.

2. The tracking system according to claim 1, wherein said tracking system also comprises a first demodulating means connected to said first phase correction means operable to demodulate said phase-corrected OFDM symbol to produce a data stream, said first demodulating means connected to a remodulating means operable to remodulate said data stream, which said remodulating means also is connected to said second estimating means.

3. The tracking system according to claim 2, wherein said second phase correction means comprises a second demodulating means connected to said transforming means, which in turn is connected to an error correction means resulting in an estimate of a received data sequence.

4. A method for tracking rapid changes in frequency and phase offset in an Orthogonal Frequency Division Multiplexing (OFDM) receiver, which method comprises the steps of:

correcting a frequency error of a received OFDM symbol;

performing a Fourier transform operation resulting in a number of independently modulated subcarriers;

performing an initial coarse estimate of the phase of the received OFDM symbol, based on the phase of pilot subcarriers;

performing an initial correction of a symbol phase;

performing a data-driven phase estimation on the corrected symbol resulting in a refined phase estimate; and performing a second, more precise, correction of the received OFDM symbol phase based on the refined phase estimate.

5. The method for tracking rapid changes in frequency and phase offset in an OFDM receiver according to claim 4, comprising the steps of:

demodulating said phase corrected OFDM symbol to produce a data stream; and remodulating said data stream.

6. The method for tracking rapid changes in frequency and phase offset in an OFDM receiver according to claim 5, wherein said method also comprises the steps of:

performing a second demodulation; and performing an error correction resulting in an estimate of a received data sequence.

7. The method for tracking rapid changes in frequency and phase offset in an OFDM receiver according to claim 6, wherein said method also comprises the step of:

providing each of the steps of said data-driven phase estimation, said first and second demodulation with an initial estimate of the channel transfer function for each subcarrier.

8. The method for tracking rapid changes in frequency and phase offset in an OFDM receiver according to claim 7, wherein said method also comprises the step of:
weighting the contribution to the estimate of the channel transfer function from each subcarrier according to the strength of the subcarrier.

9. The method for tracking rapid changes in frequency and phase offset in an OFDM receiver according to claim 4, wherein said method also comprises the step of:
weighting the phase estimate from each subcarrier according to a distance between a received I-Q vector and the nearest constellation point.

10. The method for tracking rapid changes in frequency and phase offset in an OFDM receiver according to claim 9, wherein the weighting is chosen such that a received I-Q vector with a lower probability of being associated with the nearest constellation point produces a smaller contribution to the overall phase estimate from this subcarrier.

11. At least one computer program product embodied in a computer readable medium, comprising software code portions for performing the steps of claim 4.

12. A tracking system comprised in an Orthogonal Frequency Division Multiplexing (OFDM) receiver, which tracking system is operable to track rapid changes in frequency and phase offset, comprising:
a frequency correction means operable to correct a frequency error of a received OFDM symbol,
a transforming means connected to said frequency correcting means operable to perform a Fourier transform operation resulting in a number of independently modulated subcarriers,
a first estimating means connected to said transforming means operable to perform an initial coarse estimate of the phase of the received OFDM symbol, based on the phase of pilot subcarriers,
a first phase correction means connected to said first estimating means operable to perform an initial correction of a symbol phase,
a second estimating means connected to said first phase correction means operable to perform a data-driven phase estimation on the corrected symbol resulting in a refined phase estimate,
a phase and frequency tracking means connected to said second estimating means,
a first demodulating means connected to said first phase correction means operable to demodulate said phase-corrected OFDM symbol to produce a data stream, and a to said demodulating means connected remodulating means operable to remodulate said data stream, which remodulating means also is connected to said second estimating means, and
a second demodulating means connected to said transforming means, which in turn is connected to an error correction means resulting in said final estimate of the received data sequence.

13. The tracking system according to claim 12, wherein said first demodulating means and said second demodulating means are provided with an initial estimate of the channel transfer function for each subcarrier.

14. The tracking system according to claim 13, wherein said tracking system also comprises a first weighting means operable to weight the contribution to the estimate of the OFDM symbol phase from each subcarrier according to the strength of that subcarrier.

15. The tracking system according to claim 14, wherein said tracking system also comprises a second weighting means operable to weight the phase estimate from each subcarrier according to a distance between a received I-Q vector and the nearest constellation point.

16. The tracking system according to claim 15, wherein the weighting is chosen such that a received I-Q vector with a lower probability of being associated with the nearest constellation point produces a lower contribution to the overall phase estimate from this subcarrier.

17. A tracking system comprised in an Orthogonal Frequency Division Multiplexing (OFDM) receiver, the tracking system being operable to track rapid changes in frequency and phase offset, the tracking system comprising:
a frequency correction means for correcting a frequency error of a received OFDM symbol by use of a control signal;
a transforming means connected to the frequency correction means for performing a Fourier transform operation resulting in a number of independently modulated subcarriers;
a first estimating means connected to the transforming means for performing an initial coarse estimate of the phase of the received OFDM symbol, based on the phase of the subcarriers;
a first phase correction means connected to the first estimating means for performing an initial correction of the symbol phase and outputting a phase-corrected OFDM symbol; and
a second estimating means connected to the first phase correction means for performing a data-driven phase estimation on the phase-corrected OFDM symbol and outputting the control signal which is based on the data-driven phase estimation.

18. The tracking system of claim 17, further comprising a first demodulating means connected to the first phase correction means for demodulating the phase-corrected OFDM symbol to produce a data stream, the first demodulating means also being connected to a re-modulating means for re-modulating the data stream, the re-modulating means also being connected to the second estimating means.

19. A method for tracking rapid changes in frequency and phase offset in an Orthogonal Frequency Division Multiplexing (OFDM) receiver, the method comprising:
correcting a frequency error of a received OFDM symbol by use of a control signal;
performing a Fourier transform operation resulting in a number of independently modulated subcarriers;
performing an initial coarse estimate of the phase of the received OFDM symbol, based on the phase of the subcarriers;
performing an initial correction of the symbol phase to produce a phase-corrected OFDM symbol;
performing a data-driven phase estimation on the phase-corrected OFDM symbol; and
outputting the control signal based on the data-driven phase estimation.

20. The method of claim 19, further comprising:
demodulating the phase-corrected OFDM symbol to produce a data stream; and
re-modulating the data stream, wherein the data-driven phase estimation performed on the corrected symbol is based on the re-modulated data stream.

* * * * *

UNITED STATES PATENT AND TRADEMARK OFFICE
CERTIFICATE OF CORRECTION

PATENT NO. : 7,480,337 B2  
APPLICATION NO. : 11/086504  
DATED : January 20, 2009  
INVENTOR(S) : Lewis et al.

It is certified that error appears in the above-identified patent and that said Letters Patent is hereby corrected as shown below:

At column 4, lines 19-20, "to the frequency correction means connected transforming means" should be
-- transforming means connected to the frequency correction means --.

At column 4, lines 23-24, "to the transforming means connected first estimating means" should be
-- first estimating means connected to the transforming means --.

At column 4, lines 27-28, "to the first estimating means connected first phase correction means" should be
-- first phase correction means connected to the first estimating means --.

At column 4, lines 30-31, "to the first phase correction means connected second estimating means" should be
-- second estimating means connected to the first phase correction means --.

At column 4, lines 34-35, "to the second estimating means connected phase and frequency tracking means" should be
-- phase and frequency tracking means connected to the second estimating means --.

Signed and Sealed this

Ninth Day of June, 2009

JOHN DOLL  
*Acting Director of the United States Patent and Trademark Office*